(12) United States Patent
Yu et al.

(10) Patent No.: US 10,977,445 B2
(45) Date of Patent: Apr. 13, 2021

(54) WEIGHTING FEATURES FOR AN INTENT CLASSIFICATION SYSTEM

(71) Applicant: International Business Machines Corporation, Armonk, NY (US)

(72) Inventors: Yang Yu, Acton, MA (US); Ladislav Kunc, Prague (CZ); Haoyu Wang, Somerville, MA (US); Ming Tan, Malden, MA (US); Saloni Potdar, Arlington, MA (US)

(73) Assignee: International Business Machines Corporation, Armonk, NY (US)

(*) Notice: Subject to any disclaimer, the term of this patent is extended or adjusted under 35 U.S.C. 154(b) by 119 days.

(21) Appl. No.: 16/265,618

(22) Filed: Feb. 1, 2019

(65) Prior Publication Data
US 2020/0250270 A1    Aug. 6, 2020

(51) Int. Cl.
*G10L 15/22* (2006.01)
*G06F 40/30* (2020.01)
*G06N 20/00* (2019.01)

(52) U.S. Cl.
CPC .............. *G06F 40/30* (2020.01); *G06N 20/00* (2019.01)

(58) Field of Classification Search
CPC .......... G06N 20/00; G10L 15/00; G06F 40/30
See application file for complete search history.

(56) References Cited

U.S. PATENT DOCUMENTS

| 8,046,317 | B2  | 10/2011 | Dasgupta et al. |
| 8,738,359 | B2  | 5/2014  | Gupta et al.    |
| 9,043,285 | B2  | 5/2015  | Bakkerman       |
| 2007/0239638 | A1* | 10/2007 | Zhuang ............ G06K 9/6269 706/20 |

(Continued)

FOREIGN PATENT DOCUMENTS

WO    2017090051 A1    6/2017

OTHER PUBLICATIONS

Hwang, Jae Pil, Seongkeun Park, and Euntai Kim. "A new weighted approach to imbalanced data classification problem via support vector machine with quadratic cost function." Expert Systems with Applications 38.7 (2011): 8580-8585. (Year: 2011).*

(Continued)

*Primary Examiner* — Jialong He
(74) *Attorney, Agent, or Firm* — Tyrus S. Cartwright

(57) ABSTRACT

A computer-implemented method includes obtaining a training data set including a plurality of training examples. The method includes generating, for each training example, multiple feature vectors corresponding, respectively, to multiple feature types. The method includes applying weighting factors to feature vectors corresponding to a subset of the feature types. The weighting factors are determined based on one or more of: a number of training examples, a number of classes associated with the training data set, an average number of training examples per class, a language of the training data set, a vocabulary size of the training data set, or a commonality of the vocabulary with a public corpus.

(Continued)

The method includes concatenating the feature vectors of a particular training example to form an input vector and providing the input vector as training data to a machine-learning intent classification model to train the model to determine intent based on text input.

20 Claims, 11 Drawing Sheets

(56) References Cited

U.S. PATENT DOCUMENTS

| | | | | |
|---|---|---|---|---|
| 2011/0289025 | A1* | 11/2011 | Yan | G06N 20/00 706/12 |
| 2012/0158399 | A1* | 6/2012 | Tremblay | G10L 15/063 704/9 |
| 2013/0097103 | A1* | 4/2013 | Chari | G06N 20/00 706/12 |
| 2014/0180975 | A1* | 6/2014 | Martinez | G06N 20/00 706/12 |
| 2016/0379140 | A1* | 12/2016 | Abu-Mostafa | G06N 20/00 703/12 |
| 2018/0137855 | A1* | 5/2018 | Lee | G10L 15/063 |
| 2018/0157638 | A1* | 6/2018 | Li | G06N 3/08 |
| 2020/0050667 | A1* | 2/2020 | Lin | G06N 3/084 |
| 2020/0065384 | A1* | 2/2020 | Costello | G06N 3/04 |

OTHER PUBLICATIONS

Lee, Su-In, et al., "Learning a Meta-Level Prior for Feature Relevance from Multiple Related Tasks", Proceedings of the 24 the International Conference on Machine Learning, 2007, 8 pages.

Lei, Shang, "A Feature Selection Method Based on Information Gain and Genetic Algorithm", 2012 International Conference on Computer Science and Electronics Engineering., 2012, 4 pages.

Wang, Deqing, et al., "Feature Selection Based on Term Frequency and T-Test for Text Categorization", Proceedings of the 21st ACM international conference on Information and knowledge management, 2012, 5 pages.

Xu, Yan, et al., "Term-frequency Based Feature Selection Methods for Text Categorization", 2010 Fourth International Conference on Genetic and Evolutionary Computing., 2010, 4 pages.

* cited by examiner

WEIGHTING FEATURES FOR AN INTENT CLASSIFICATION SYSTEM

BACKGROUND

The present invention relates to intent classification systems, and more specifically, to training machine-learning intent classification systems.

SUMMARY

According to an embodiment of the present invention, a computer-implemented method for training a machine-learning intent classification model includes obtaining a training data set including a plurality of training examples. Each training example includes text data of a respective phrase or sentence. The method includes generating, for each training example of the training data set, multiple feature vectors corresponding, respectively, to multiple feature types. The method includes applying weighting factors to feature vectors corresponding to at least a subset of the feature types. The weighting factors are determined based on one or more of: a number of training examples included in the training data set, a number of classes associated with the training data set, an average number of training examples per class of the training data set, a language associated with the training data set, a vocabulary size of the training data set, or a commonality of a vocabulary of the training data set with a public corpus. The method includes concatenating the feature vectors of a particular training example to form an input vector for the particular training example. The method includes providing the input vector as training data to the machine-learning intent classification model to train the machine-learning intent classification model to determine intent based on text input.

According to an embodiment of the present invention, an apparatus includes a processor and a memory coupled to the processor and storing instructions that, when executed by the processor, cause the processor to perform operations including obtaining a training data set including a plurality of training examples. Each training example includes text data of a respective phrase or sentence. The operations include generating, for each training example of the training data set, multiple feature vectors corresponding, respectively, to multiple feature types. The operations include applying weighting factors to feature vectors corresponding to at least a subset of the feature types. The weighting factors are determined based on one or more of: a number of training examples included in the training data set, a number of classes associated with the training data set, an average number of training examples per class of the training data set, a language associated with the training data set, a vocabulary size of the training data set, or a commonality of a vocabulary of the training data set with a public corpus. The operations include concatenating the feature vectors of a particular training example to form an input vector for the particular training example. The operations further include providing the input vector as training data to a machine-learning intent classification model to train the machine-learning intent classification model to determine intent based on a text input.

According to an embodiment of the present invention, a computer program product for training a machine-learning intent classification model includes a computer readable storage medium having program instructions embodied therewith. The program instructions are executable by a processor to cause the processor to obtain a training data set including a plurality of training examples. Each training example includes text data of a respective phrase or sentence. The processor is caused to generate, for each training example of the training data set, multiple feature vectors corresponding, respectively, to multiple feature types. The processor is caused to apply weighting factors to feature vectors corresponding to at least a subset of the feature types. The weighting factors are determined based on one or more of: a number of training examples included in the training data set, a number of classes associated with the training data set, an average number of training examples per class of the training data set, a language associated with the training data set, a vocabulary size of the training data set, or a commonality of a vocabulary of the training data set with a public corpus. The processor is caused to concatenate the feature vectors of a particular training example to form an input vector for the particular training example. The processor is further caused to provide the input vector as training data to the machine-learning intent classification model to train the machine-learning intent classification model to determine intent based on a text input.

DETAILED DESCRIPTION

Figure 1:
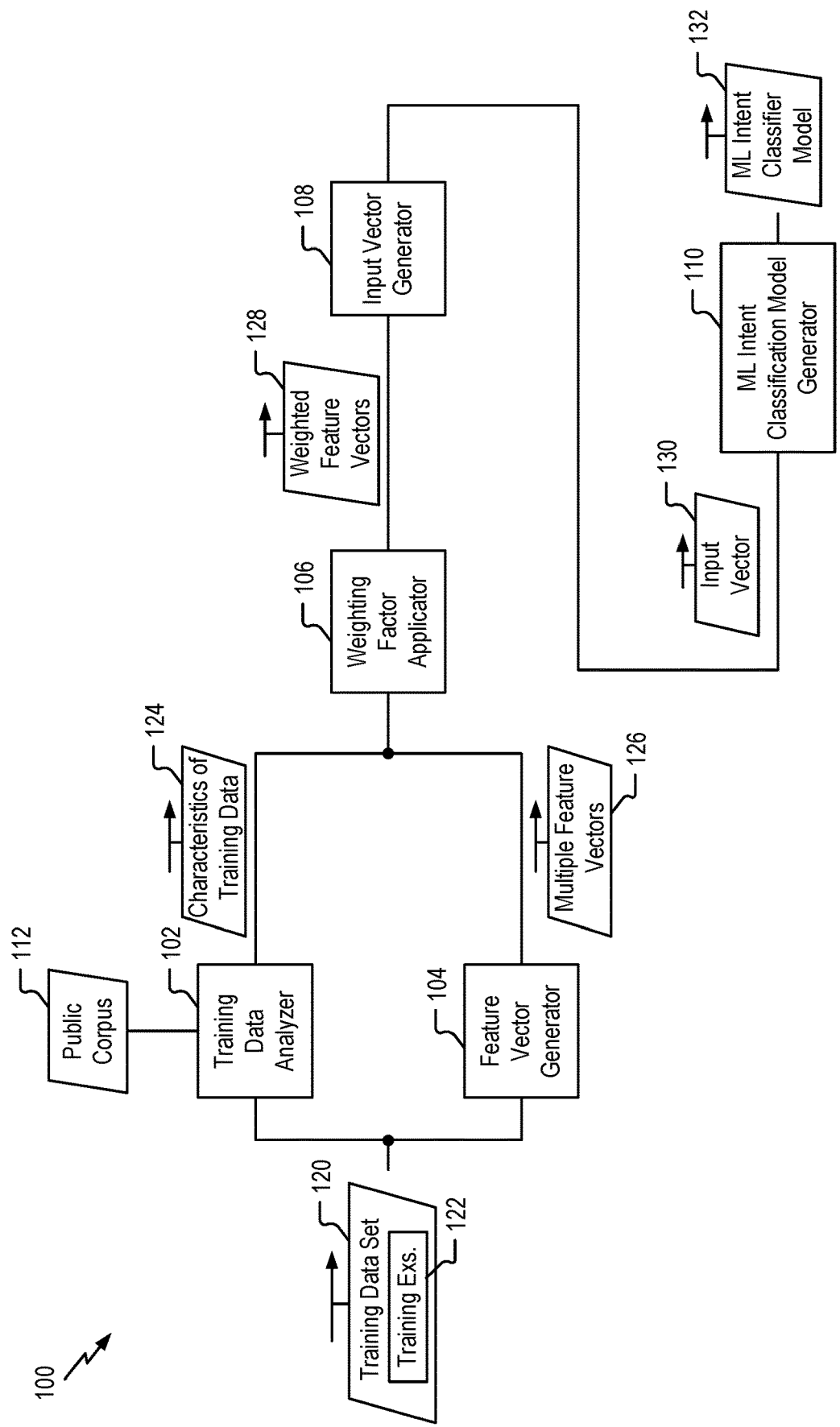
FIG. 1 is a block diagram of a system that is operable to apply weighting factors to feature vectors used to train a machine-learning intent classification model.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Machine-learning intent detection and classification is a key component in many modern human-computer interaction systems. For example, a machine-learning intent classification model may be used as part of an automated customer response system. To illustrate, a customer may enter a question or a response using their natural language, and the machine-learning intent classification model determines the intent behind the words of the text, such as a particular question being asked or a request being made. To train the machine-learning intent classification model, training examples, such as particular sentences or phrases, are labeled and provided to train the machine-learning intent classification model to determine intent based on text input. For example, thousands, possibly even millions of features may be extracted from the training examples and provided to the machine-learning intent classification model as training data. In other examples, only a few training examples are available to train the machine-learning intent classification model. Because of the different characteristics of the training examples, designing a single configuration to train a machine-learning intent classification model can be difficult and can lead to performance degradation for certain sets of training examples.

The present disclosure describes systems, methods, and computer program products that enable dynamic configuration of training of a machine-learning intent classification model (e.g., a text classification model). This dynamic configuration is achieved through applying weighting factors to features based on a particular set of characteristics of a training data set. The particular set of characteristics includes a number of training examples included in the training data set, a number of classes associated with the training data set, an average number of training examples per class of the training data set, a language associated with the training data set, a vocabulary size of the training data set, or a commonality of a vocabulary of the training data set with a public corpus. By applying different weighting factors to different types of features, the system can modify the importance associated with the corresponding types of features during the training of the machine-learning intent classification model. In this manner, the machine-learning intent classification model can be trained by focusing on the more important features and not the less important features, for example, especially when the training set is large and the machine-learning training process could be degraded by noisy feature types (e.g., character-level feature types, in some situations).

One advantage provided by the systems, methods, and computer program products described herein is generation of (e.g., training of) a machine-learning intent classification model faster, using fewer processing resources, than conventional techniques for training machine-learning intent classification models. To illustrate, for training data sets having particular characteristics, some types of features are more important to the determination of intent than other features. By applying lower weighting factors to the less important features, the system indicates to the machine-learning intent classification model that these particular features are less important and therefore that other features should be focused on during the training process. Because features that are more likely to be relevant to intent are weighted higher than the other features, the machine-learning intent classification model converges faster on an acceptable model (e.g., a model having an acceptable accuracy rate). Increasing the speed with which the training converges improves the operation of a computer by decreasing the amount of time and processing resources spent generating the machine-learning intent classification model.

With reference to FIG. 1, a system 100 for applying weighting factors to features used to train a machine-learning intent classification model is shown. In the illustrated example, the system 100 includes a training data analyzer 102, a feature vector generator 104, a weighting factor applicator 106, an input vector generator 108, and a machine-learning intent classification model generator 110. The weighting factor application 106 is coupled to the training data analyzer 102 and to the feature vector generator 104, the input vector generator 108 is coupled to the weighting factor applicator 106, and the machine-learning intent classification model generator 110 is coupled to the input vector generator 108.

In a particular implementation, each of the elements 102-110 corresponds to hardware. For example, the elements 102-110 may be embodied in a processor, a controller, a field-programmable gate array (FPGA), an application-specific integrated circuit (ASIC), or another form of hardware. In other implementations, the operations described with reference to the elements 102-110 are performed by a processor executed computer-readable instructions, as further described with reference to FIG. 4.

The system 100 is configured to obtain a training data set 120. The training data set 120 includes a plurality of training examples 122. Each training example includes text data of a respective phrase or sentence. Each training example also includes a class (e.g., intent) label for the phrase or sentence. In some implementations, the training data set 120 is provided to the system 100, such as being stored on a memory accessible (or included in) the system 100 or being received from another device via network transmission. In a particular implementation, the training data set 120 has already been stored as text data. Alternatively, audio data may be provided, and automatic speech recognition and text to speech conversion may be performed on the audio data to generate the training data set 120.

The training examples 122 of the training data set 120 are generated by an end-user for a machine-learning intent classification model 132, such as a customer of a producer of the system 100. The training examples 122 may correspond to examples of speech, such as questions, commands, etc., that are expected to be received from users of a voice response system that integrates the machine-learning intent classification model 132. The training data set 120 may include as few as five to ten training examples, or as many as millions of training examples, depending on the customer and how much information is known ahead of time. Each of the training examples 122 is labeled to indicate an intent associated with the respective training example, for use in supervised learning, as further described herein. Additionally, or alternatively, the training examples 122 may include other labels, such as whether the respective training sample is in-domain or out-of-domain, or other information. In a particular implementation, each of the training examples 122 is categorized into one of multiple classes (e.g., corresponding to various intents), and each training example is labeled based on the class. The training examples 122 may also include text from one or multiple languages, such as English, Spanish, French, Russian, German, Japanese, Korean, or Chinese, as non-limiting examples.

The training data analyzer 102 is configured to receive the training data set 120 and to analyze the training data set 120 to determine characteristics 124 of the training data set 120. In a particular implementation, the characteristics 124 include one or more of a number (e.g., a count) of the training example 122, a number (e.g., a count) of classes associated with the training data set 120, an average number of training examples per class of the training data set 120, a language associated with the training data set 120, a vocabulary size of the training data set, or a commonality of a vocabulary of the training data set 120 with a public corpus 112. For example, the training data analyzer 102 may be configured to count the number of the training examples 122 included in the training data set 120 or to count the number of classes associated with the training data set 120. The number of training examples indicates how large the training data set 120 is, and the number of classes indicates how complex the classification output is. As another example, the training data analyzer 102 may be configured to determine an average number of training examples per class of the training data set 120. The average number of examples per class is related to how easy or difficult it is to learn each class based on the training examples. As another example, the training data analyzer 102 may be configured to identify a language of the training data set 120 (e.g., of the training examples 122). Different features may be stronger or weaker depending on the language. As another example, the training data analyzer 102 may be configured to determine a vocabulary size (e.g., a count of unique words) associated with the training data set 120. The vocabulary size indicates the language variety of the training data set 120. As another example, the training data analyzer 102 may be configured to compare a vocabulary (e.g., a set of unique words) associated with the training data set 120 with the public corpus 112 (e.g., a collection of language data). The commonality of the vocabulary indicates the domain specificity of the data by comparing it with a large public text corpus. The public corpus 112 may be stored at a memory of the system 100 or stored at a device that is accessible to the training data analyzer 102. Comparing the vocabulary to the public corpus 112 may include comparing the size of the vocabulary to a size of the public corpus 112, comparing the particular words of the vocabulary to the particular words of the public corpus 112, or some other form of comparison. In some implementations, the comparison results in a similarity metric indicating a similarity between the vocabulary of the training data set 120 and the public corpus 112. After determining the characteristics 124, the training data analyzer 102 is configured to provide the characteristics 124 to the weighting factor applicator 106.

The feature vector generator 104 is configured to receive the training data set 120 and to generate, for each of the training examples 122 included in the training data set 120, multiple feature vectors 126 corresponding, respectively, to multiple feature types.

In a particular implementation, the feature types include character-level features, word-level features, concept features, semantic features, or a combination thereof. In other implementations, the feature types may include other types of features. Character-level features include features based on one or more characters, which may be referred to as "n-grams" where n is 1, 2, 3, or any other positive integer. For example, character trigram features for the word "united" include the trigrams "uni", "nit", "ite", and "ted". Word-level features include features based on one or more words. For example, word-level features may be based on n-grams of words, where n is 1, 2, 3, or any other positive integer. To further illustrate, word bigrams for the phrase "The quick brown fox jumped" include "The quick", "quick brown", "brown fox", and "fox jumped". Word features can also be based on word stems or lemmas. Concept features include features describing clusters of similar phrases or words. For example, a cluster based on the letters "US" may include "United States," "U.S.A.", and "USA," as a non-limiting example.

Semantic features include features based on the meanings of words or phrases. In some implementations, semantic features are generated by another model, such as a neural network, and include high-dimensional dense feature vectors. To illustrate, the words of a particular training example are separated into each word, and each word is provided to a mapper, such as a convolutional neural network, that maps the words into a feature space. Distances between the features in the feature space represent syntactic or semantic similarities (or differences) between the words. The mapper may be trained by all of the training examples 122, a collection of word data (such as the public corpus 112), or a combination thereof.

After extracting the features, the features are grouped by type to form the multiple feature vectors 126, such that each feature vector of the multiple feature vectors 126 includes feature vectors of a single type. For example, based on a first training example, the feature vector generator 104 may generate a feature vector of character features, a feature vector of word features, a feature vector of concept features, and a feature vector of semantic features. The feature vector generator 104 is configured to provide the multiple feature vectors 126 to the weighting factor applicator 106.

The weighting factor applicator 106 is configured to receive the characteristics 124 and the multiple feature vectors 126 and to apply weighting factors to feature vectors of the multiple feature vectors 126 that correspond to at least a subset of the feature types. The weighting factors are based on the characteristics 124. For example, if a particular characteristic of the characteristics 124 satisfies (e.g., is greater than or equal to) a threshold, a weighting factor having a low value may be applied to feature vectors having a first feature type, and default weighting factors are applied to the other feature vectors. As a particular, non-limiting example, if the number of the training examples 122 satisfies a first threshold, weighting factors having low values are applied to feature vectors that include character-level features and feature vectors that include concept features, while feature vectors that include word-level features or semantic features are assigned a default value for a weighting factor. Examples of assigning weighting factors to feature vectors are further described with reference to FIGS. 2A-2C. Applying the weighting factors to the multiple feature vectors 126 generates weighted feature vectors 128.

The weighting factors indicate an importance of that respective feature type for the purpose of training the machine-learning intent classification model 132. For example, applying a small weighting factor (e.g., a value less than the default weighting factor) to a particular type of features (e.g., a feature vector) indicates that the particular type of feature is less important in determining the intent. Conversely, applying a large weighting factor (e.g., a value greater than the default weighting factor) to a particular type of feature indicates that the particular type of feature is more important in determining the intent. Adjusting the importance of particular types of features by applying weighting factors can cause faster model training, as further described herein. Additionally, applying the weighting factors can cause better model stability for models that have a small number of training examples in the training set. For example, the machine-learning intent classification model 132 generalizes better as a larger number of similarly weighted features are used as training data.

The input vector generator 108 is configured to receive the weighted feature vectors 128 and to concatenate feature vectors of a particular training example to form an input vector 130 for the particular training example. For example, the input vector generator 108 may concatenate feature vectors of different feature types to generate the input vector 130. The input vector 130 is provided to the machine-learning intent classification model generator 110. Although a single input vector is described, the input vector generator 108 is configured to generate a respective input vector for each of the training examples 122.

The machine-learning intent classification model generator 110 is configured to receive the input vector 130 and to use the input vector 130 as training data to train the machine-learning intent classification model 132 to determine intent based on a text input. In a particular implementation, the machine-learning intent classification model 132 is a neural network. In another particular implementation, the machine-learning intent classification model 132 is a support vector machine (SVM). Training the machine-learning intent classification model 132 sets values of parameters of the machine-learning intent classification model 132 to values that enable the machine-learning intent classification model 132 to correctly classify the training data set 120 within a desired accuracy range. For example, if the machine-learning intent classification model 132 is a neural network, connection weights between nodes, numbers of layers, numbers of nodes per layer, etc., may be determined. The training may be performed using techniques such as gradient descent, backpropagation, other techniques, or a combination thereof, as non-limiting examples.

A simplified example is now explained to describe the effect of applying weighting factors to feature vectors prior to using the feature vectors to train the machine-learning intent classification model 132. For this example, assume that a model that predicts the sentiment of a product review (where 0 stands for negative and 1 stands for positive) is to be trained. To simplify the problem, assume there are two types of features—an N-dimensional feature set $X=\{x\_1, x\_2, \ldots, x\_N\}$ and a M-dimensional feature set $Z=\{z\_1, z\_2, \ldots, z\_M\}$. As an illustrative example, assume X is a bag-of-words feature set, which in this example is a strong predictor of the review, and Z is the author's information (e.g., gender, age, location, etc.), which in this example is a very weak predictor of the review.

For this example, assume the model is to be a simple linear regression model which maps the input features to a real number between 0 and 1 (e.g., the review). Also, assume y is a label having a real value between 0 and 1. The learning objective for this approach could be written as the following, where w is a weight learned by the model:

$$\text{minimize}(y-[X,Z]w^\wedge T)=\text{minimize}(y-[x\_1, \ldots, x\_N, z\_1, \ldots, z\_M][w\_1, w\_2, \ldots, w\_(N+M)]^\wedge T)$$

According to the techniques of the present disclosure, weighting factors are applied to the features to introduce prior knowledge (e.g., of the strength of the features in relation to the output of the model) to manipulate the feature set before the feature set is fed into the model. To illustrate, the weighting factors s1 and s2 (distinct from the weights w learned by the model) are applied to the features, such that $X'=\{x\_1, x\_2, \ldots, x\_N\}*s1$ and $Z'=\{z\_1, z\_2, \ldots, z\_M\}*s2$. The learning objective for this approach could be written as the following:

$$\text{minimize}(y-[X',Z']w^\wedge T)=\text{minimize}(y-[x\_1*s1, \ldots, x\_N*s1, z\_1*s2, z\_M*s2][w\_1, w\_2, \ldots, w\_(N+M)]^\wedge T)$$

For both approaches, the learning algorithm is usually set to randomly initialize w_i following a uniform distribution in a certain range [−a, a] and then use gradient descent to find the optimum value. In an idealized case (where there is an unlimited amount of training data), both algorithms should theoretically converge to the same optimum value after the training process. However, they may take significantly different paths and training steps to do so. The first approach (e.g., the approach that does not apply weighting factors to the features) may struggle to learn that Z is less relevant to the task by gradually decreasing the value associated with z_i by pushing $\{w\_(N+1), \ldots, w(N+M)\}$ close to 0 through gradient descent so that abs(w_i*z_i) becomes small and makes less contribution to the final results. In the second approach (e.g., the approach that applies weighting factors to the features), the feature values z_i are downscaled, through application of the weighting factors, to push the values close to 0 before training so that the model does not need to struggle to find a very small w_i. This increases the speed with which the model is trained and decreases the amount of processing resources used to train the model, thereby improving operation of a computer.

Additionally, in a real (e.g., non-ideal case), there is often only a limited amount of training data. In some cases, if there is not enough training data, it cannot be guaranteed that the model will learn the optimum values of w_i. To illustrate, assume there are only four training examples: 2 reviews from females that are positive and 2 reviews from males that are negative. If there is no downscaling for $z\_i$, the model may converge on a solution that indicates that the gender feature is a strong signal for the task, resulting in training that if the review is written by a female, it is positive, otherwise, it is negative. This works well for the limited training data, but such a model will completely fail when used on actual reviews (of which many reviews by males are positive). Instead, in accordance with the present disclosure, feature $z\_i$ (e.g., the gender feature) is downscaled based on characteristics of the training data, which forces the model to try to rely on feature $x\_i$ instead of struggling to find a large value for $z\_i$. As a result, the model is more accurate—the classification of the review is based on the words in the review and not the gender of the reviewer. Thus, applying weighting factors to features prior to providing the features to the machine-learning intent classification model 132 for training improves the accuracy of the machine-learning intent classification model 132, in addition to reducing the amount of processing resources used to train the machine-learning intent classification model 132.

During operation, the training data analyzer 102 receives the training data set 120 and analyzes the training data set 120 to determine the characteristics 124. In a particular implementation, the characteristics 124 include one or more of the number of the training example 122, the number of classes associated with the training data set 120, the average number of training examples per class of the training data set 120, the language associated with the training data set 120, the vocabulary size of the training data set 120, or the commonality of a vocabulary of the training data set 120 with a public corpus 112. The feature vector generator 104 extracts multiple feature types from each of the training examples 122 of the training data set 120 to generate the multiple feature vectors 126. The feature types include character-level features, word-level features, concept features, semantic features, other features, or a combination thereof.

The weighting factor applicator 106 applies weighting factors to each of the multiple features vectors 126 to generate the weighted feature vectors 128. The weighting factors are determined based on the characteristics 124. For example, the weighting factor applicator 106 may apply weighting factors having a small value (or a large value) to a subset of the multiple feature vectors 126 having particular feature types based on the characteristics 124. Other feature vectors corresponding to other feature types may be assigned a default weighting factor, such as 1. Examples of assigning weighting factors to features are further described with reference to FIGS. 2A-2C.

The input vector generator 108 concatenates the weighted feature vectors 128 corresponding to a particular training example to generate the input vector 130. In this manner, an input vector for each training example may be generated. The machine-learning intent classification model generator 110 uses the input vector 130 (and other input vectors) as training data to train the machine-learning intent classification model 132 to determine intent based on a text input. For example, for newly input text data, features may be extracted and provided to the machine-learning intent classification model 132 to determine which class (of the classes associated with the training data set 120) the newly input text data belongs to, which indicates the intent of the newly input text data. The machine-learning intent classification model 132 may be stored at a memory (for execution by the system 100) or transmitted to another device for use by the other device. In a particular implementation, the machine-learning intent classification model 132 may be deployed as part of a virtual "chat-bot" that enables users to ask questions from their computer and receive answers based on the text of the questions. For example, the chat-bot may display a support prompt, and a user may enter text in response to the support prompt. The machine-learning intent classification model 132 is software (or a part of software) that may be executed at the system 100 or another device to determine intent based on text input. Thus, at a high-level, the system 100 is configured to generate software.

One advantage provided by system 100 is generation of (e.g., training of) the machine-learning intent classification model 132 faster, using fewer processing resources, than conventional techniques for training machine-learning intent classification models. To illustrate, for training data sets having particular characteristics, some types of features (such as character-level features or word-level features) are more important to the determination of intent than other features. By applying lower weighting factors to the less important features, the system 100 indicates to the machine-learning intent classification model 132 that these particular features are less important and therefore that other features should be focused on during the training process. Because features that are more likely to be relevant to intent are weighted higher than the other features, the machine-learning intent classification model 132 converges faster on an acceptable model (e.g., a model having an acceptable accuracy rate). Increasing the speed with which the training converges improves the operation of a computer by decreasing the amount of time and processing resources spent generating the machine-learning intent classification model. Additionally, applying small weighting factors may be preferable to removing the features entirely, because the machine-learning intent classification model 132 is still able to learn some information from the features. As another benefit, if the training data set 120 is small, applying weighting factors to indicate unimportant features can prevent the machine-learning intent classification model 132 from erroneously learning those features as important, which improves the accuracy of the machine-learning intent classification model 132.

Figure 2A:
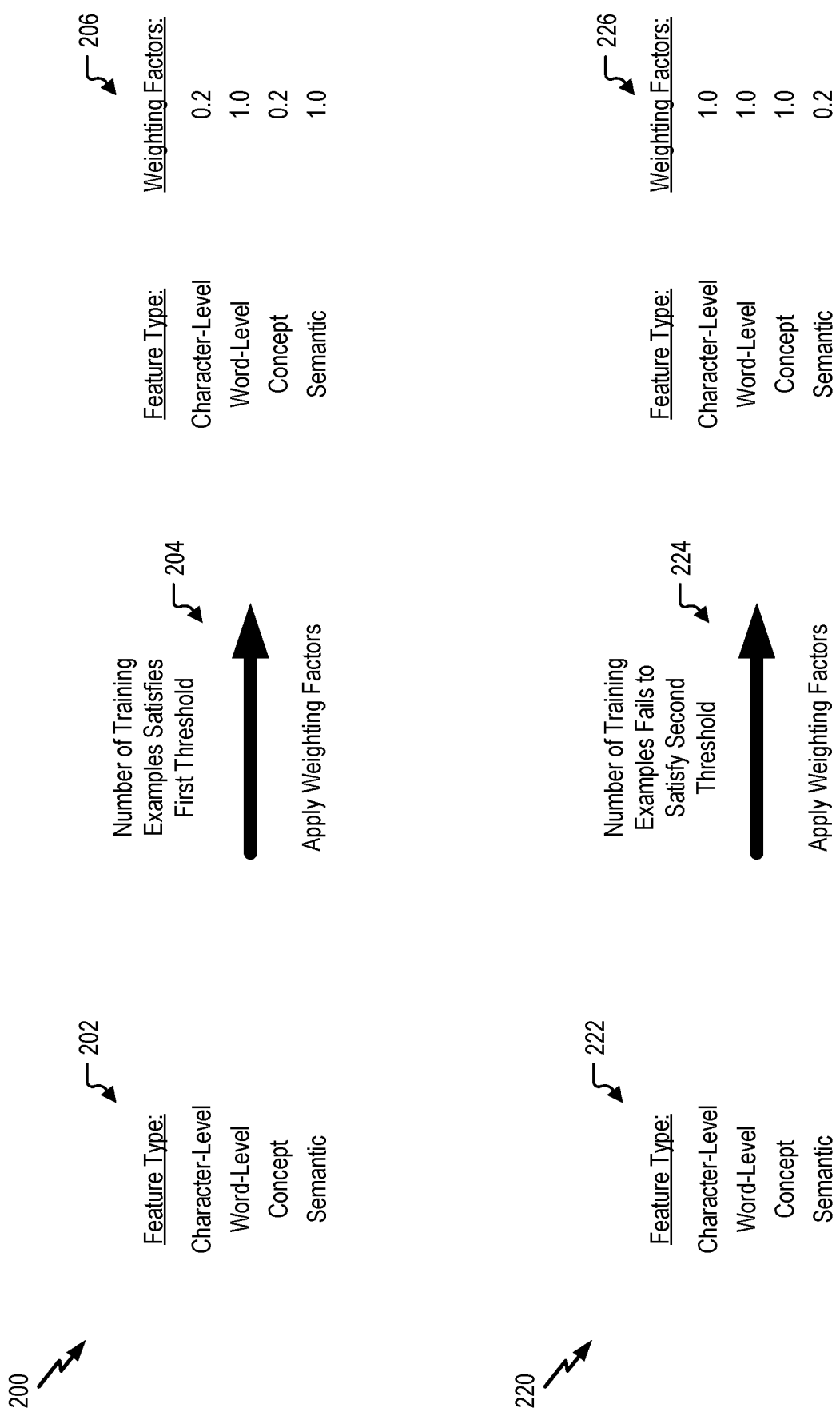
FIGS. 2A-2C are examples of applying weighting factors to particular feature types based on characteristics of a training data set.
Figure 2B:
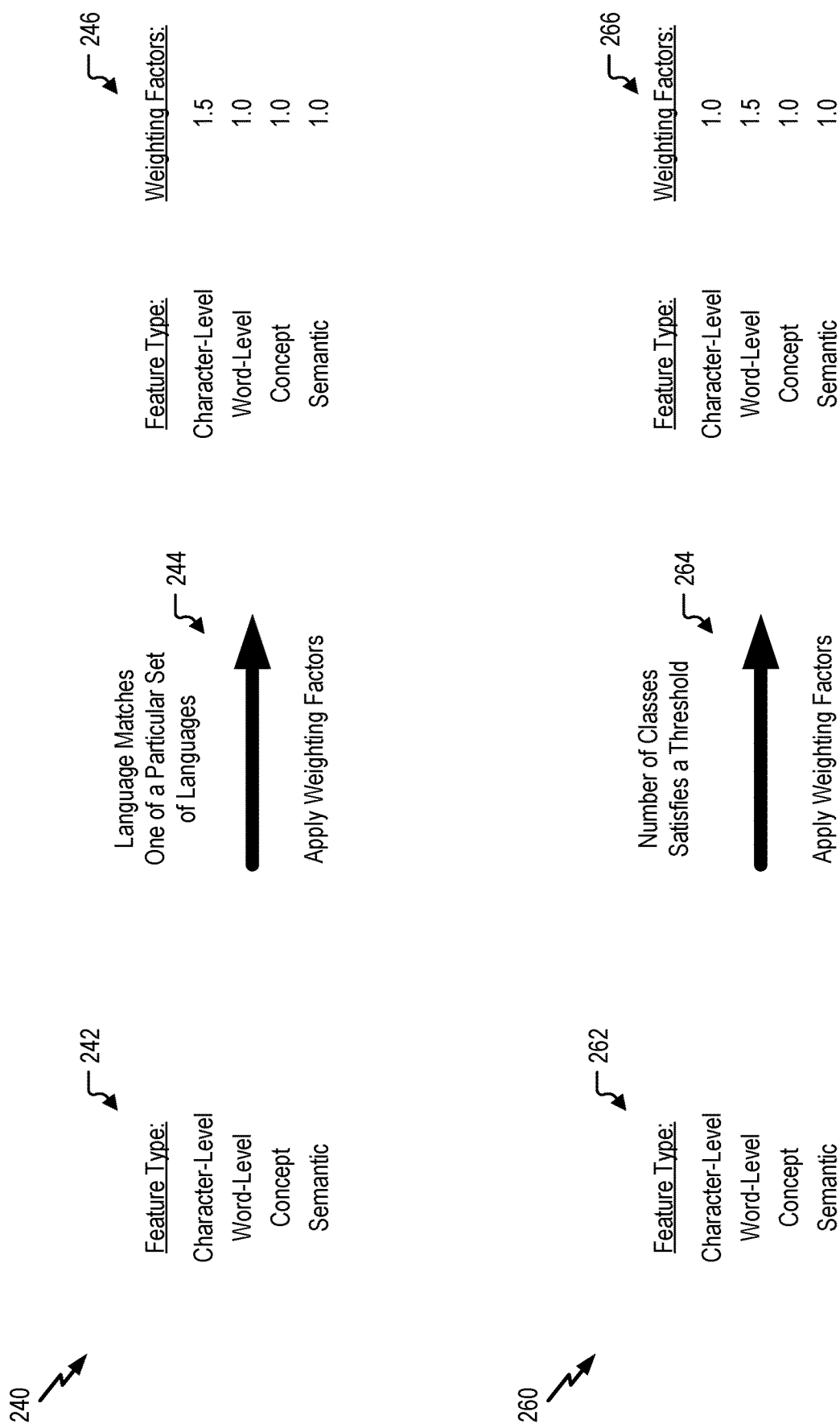
Figure 2C:
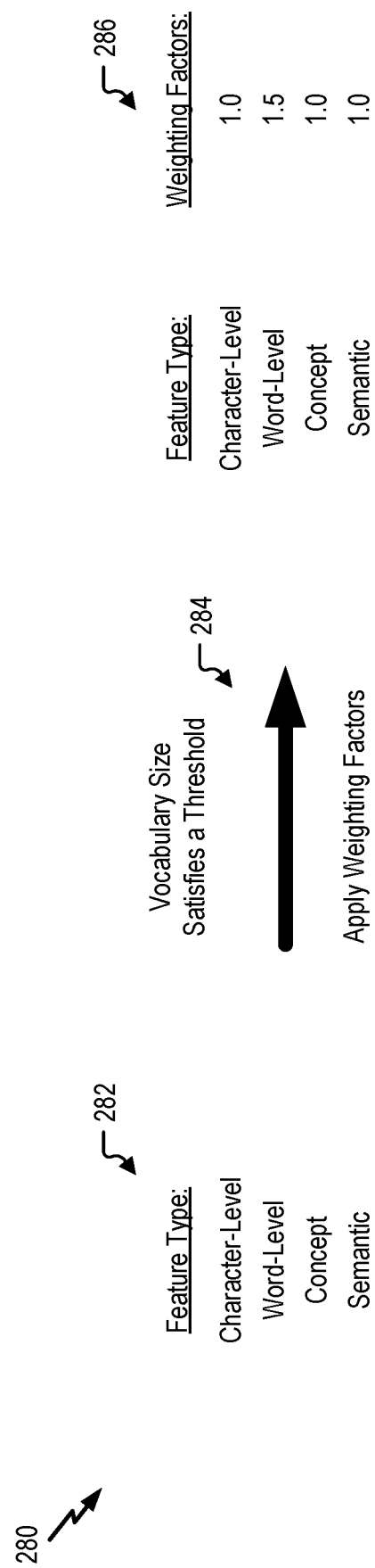

FIGS. 2A-2C are examples of applying weighting factors to particular feature types based on characteristics of a training data set. FIGS. 2A-2C illustrate five examples. Although five examples are described, these examples are illustrative and not limiting, and there may be other ways of applying weighting factors based on different characteristics of a training data set. In a particular implementation, the application of the weighting factors is performed by the weighting factor applicator 106 of FIG. 1.

FIG. 2A illustrates a first example 200. In the first example 200, there are four feature types 202: character-level features, word-level features, concept features, and semantic features. In other implementations, other feature types may be included in the feature types 202. Each feature type of the feature types 202 corresponds to one (or more) feature vectors.

Weighting factors 206 are applied, at 204, based on characteristics of a training data set (such as the characteristics 124 of the training data set 120 of FIG. 1). Non-default weighting factors are applied to a subset of the feature types 202, and default weighting factors are applied to the other feature types. In the first example 200, a determination is made that the number of training examples (e.g., the training examples 122 of FIG. 1) satisfies a first threshold. The first threshold is selected as a value that indicates a sufficiently large number of training examples, such that it is more likely that the word-level of granularity is more important than the character-level of granularity in features. For example, character-level features may be more noisy when there are a large number of training examples. Thus, at 204, weighting factors that are less than the default weighting factors are applied to the character-level features and the concept features, and default weighting factors are applied to the word-level features and the semantic features. For example, a weighting factor having a value of 0.2 is applied to the character-level features. Additionally, another weighting factor of 0.2 is applied to the concept features. Default weighting factors of 1.0 are applied to the word-level features and the semantic features. Applying these weighting factors (that are less than the weighting factors applied to other feature types) indicates to a machine-learning intent classification model (such as the machine-learning intent classification model 132 of FIG. 1) that the respective features are less important, as described with reference to FIG. 1. Although weighting factors of 0.2 and default weighting factors of 1.0 are described, any weighting factor that is less than the default weighting factor may be applied. The value of the weighting factor depends on the decrease (or increase) to the importance of the respective feature type.

FIG. 2A also illustrates a second example 220. In the second example 220, there are four feature types 222: character-level features, word-level features, concept features, and semantic features. In other implementations, other feature types may be included in the feature types 222. Each feature type of the feature types 222 corresponds to one (or more) feature vectors.

Weighting factors 226 are applied, at 224, based on characteristics of a training data set (such as the characteristics 124 of the training data set 120 of FIG. 1). Non-default weighting factors are applied to a subset of the feature types 222, and default weighting factors are applied to the other feature types. In the second example 220, a determination is made that the number of training examples (e.g., the training examples 122 of FIG. 1) fails to satisfy (e.g., is less than) a second threshold. The second threshold is selected as a value that indicates a sufficiently small number of training examples, such that semantic features may be more noisy than useful in determining intent. Thus, at 224, weighting factors that are less than the default weighting factors are applied to the semantic features, and default weighting factors are applied to the character-level features, the word-level features, and the concept features. For example, a weighting factor having a value of 0.2 is applied to the semantic features. In a particular implementation, the weighting factor is based on the average number of training examples per class of the training data set. For example, the weighting factor may be given by the following equation:

weighting factor=min(1.0*f*,avg_number_of_example_per class/20.0*f*)*min(1.0*f*,number_of_examples/200.0*f*)

Applying this weighting factor (that is less than the weighting factors applied to other feature types) indicates to a machine-learning intent classification model (such as the machine-learning intent classification model 132 of FIG. 1) that the respective features are less important, as described with reference to FIG. 1.

FIG. 2B illustrates a third example 240. In the third example 240, there are four feature types 242: character-level features, word-level features, concept features, and semantic features. In other implementations, other feature types may be included in the feature types 242. Each feature type of the feature types 242 corresponds to one (or more) feature vectors.

Weighting factors 246 are applied, at 244, based on characteristics of a training data set (such as the characteristics 124 of the training data set 120 of FIG. 1). Non-default weighting factors are applied to a subset of the feature types 242, and default weighting factors are applied to the other feature types. In the third example 240, a determination is made that the language of the training data set matches one of a particular set of languages. In a particular implementation, the particular set of languages includes Chinese, Korean, Japanese, or any other non-whitespace tokenized language, such as Thai. If the language matches one of these languages, a larger value of a weighting factor is applied to the character-level features because the characters are more important in these languages (e.g., some characters represent full word meanings) and tokenizers often make mistakes in word segmentation for these languages. Additionally, different lengths of character-level features can be generated, such as character-level bigrams and trigrams together. Thus, at 244, a weighting factor that is greater than the default weighting factors is applied to the character-level features, and default weighting factors are applied to the word-level features, the concept features, and the semantic features. For example, a weighting factor having a value of 1.5 is applied to the character-level features. Default weighting factors of 1.0 are applied to the word-level features, the concept features, and the semantic features. Applying this weighting factor (that is greater than the weighting factors applied to other feature types) indicates to a machine-learning intent classification model (such as the machine-learning intent classification model 132 of FIG. 1) that the respective features are more important, as described with reference to FIG. 1. Although a weighting factor of 1.5 and default weighting factor of 1.0 are described, any weighting factor that is greater than the default weighting factor may be applied. The value of the weighting factor depends on the decrease (or increase) to the importance of the respective feature type.

FIG. 2B also illustrates a fourth example 260. In the fourth example 260, there are four feature types 262: character-level features, word-level features, concept features, and semantic features. In other implementations, other feature types may be included in the feature types 262. Each feature type of the feature types 262 corresponds to one (or more) feature vectors.

Weighting factors 266 are applied, at 264, based on characteristics of a training data set (such as the characteristics 124 of the training data set 120 of FIG. 1). Non-default weighting factors are applied to a subset of the feature types 262, and default weighting factors are applied to the other feature types. In the fourth example 260, a determination is made that the number of classes associated with the training data set satisfies a first threshold. The threshold is selected as a value that indicates a sufficiently large number of classes, such that it is more likely that the word-level of granularity is more important than the character-level of granularity in features. Thus, at 264, a weighting factor that is greater than the default weighting factors is applied to the word-level features, and default weighting factors are applied to the character-level features, the concept features, and the semantic features. For example, a weighting factor having a value of 1.5 is applied to the word-level features. Default weighting factors of 1.0 are applied to the character-level features, the concept features, and the semantic features. Applying this weighting factor (that is greater than the weighting factors applied to other feature types) indicates to a machine-learning intent classification model (such as the machine-learning intent classification model 132 of FIG. 1) that the respective features are less important, as described with reference to FIG. 1.

FIG. 2C illustrates a fifth example 280. In the fifth example 280, there are four feature types 282: character-level features, word-level features, concept features, and semantic features. In other implementations, other feature types may be included in the feature types 282. Each feature type of the feature types 282 corresponds to one (or more) feature vectors.

Weighting factors 286 are applied, at 284, based on characteristics of a training data set (such as the characteristics 124 of the training data set 120 of FIG. 1). Non-default weighting factors are applied to a subset of the feature types 282, and default weighting factors are applied to the other feature types. In the fifth example 280, a determination is made that the vocabulary size of the training data set satisfies a threshold. The threshold is selected as a value that indicates a sufficiently large vocabulary, such that it is more likely that the word-level of granularity is more important than the character-level of granularity in features. For example, word-level features may be less noisy when there are a large number of unique words that are used (e.g., a large vocabulary). Thus, at 284, a weighting factor that is greater than the default weighting factors is applied to the word-level features, and default weighting factors are applied to the character-level features, the concept features, and the semantic features. For example, a weighting factor having a value of 1.5 is applied to the word-level features. Default weighting factors of 1.0 are applied to the character-level features, the concept features, and the semantic features. Applying this weighting factor (that is greater than the weighting factors applied to other feature types) indicates to a machine-learning intent classification model (such as the machine-learning intent classification model 132 of FIG. 1) that the respective features are less important, as described with reference to FIG. 1.

Figure 3:
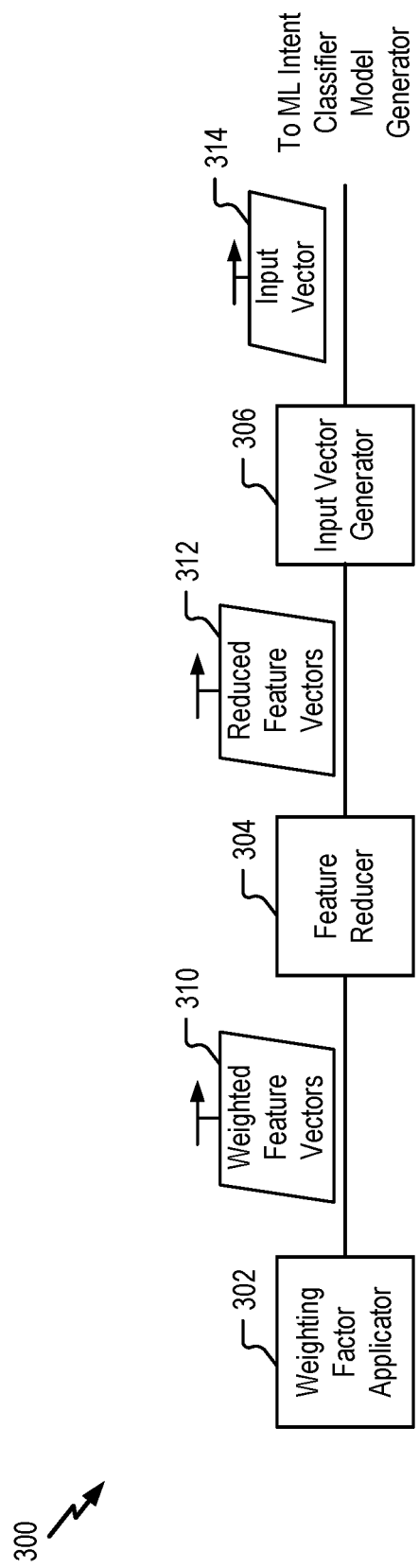
FIG. 3 is a block diagram of a system that is operable to reduce a number of features used to train a machine-learning intent classification model.

FIG. 3 illustrates a diagram of a system 300 that is operable to reduce a number of features used to train a machine-learning intent classification model, such as the machine-learning intent classification model 132 of FIG. 1. The system 300 includes a weighting factor applicator 302, a feature reducer 304, and an input vector generator 306. The feature reducer 304 is coupled to the weighting factor applicator 302 and to the input vector generator 306.

In a particular implementation, each of the elements 102-110 corresponds to hardware. For example, the elements 102-110 may be embodied in a processor, a controller, a FPGA, an ASIC, or another form of hardware. In other implementations, the operations described with reference to the elements 102-110 are performed by a processor executed computer-readable instructions, as further described with reference to FIG. 4. In a particular implementation, the system 300 is included in the system 100 of FIG. 1. For example, the weighting factor applicator 302 and the input vector generator 306 may include or correspond to the weighting factor applicator 106 and the input vector generator 108, respectively.

The weighting factor applicator 302 is configured to receive multiple feature vectors and apply weighting factors to the multiple feature vectors to generate the weighted feature vectors 310. The weighting factors are determined based on characteristics of a training data set, as described with reference to FIG. 1.

The feature reducer 304 is configured to reduce the number of features in the weighted feature vectors 310 conditioned upon a determination whether the number of features included in the weighted feature vectors 310 satisfies a threshold. For example, the feature reducer 304 compares the number of features included in the weighted feature vectors 310 to a threshold and, if the number of features satisfies a threshold, removes one or more features from the multiple feature vectors to generate the reduced feature vectors 312. The one or more features that are removed are associated with a corresponding weighting factor that fails to satisfy a weight threshold. For example, if the number of features satisfies a threshold, such as one million features, then all features having a weighting factor that is below a particular value may be removed. Additionally, or alternatively, a particular number of features having the lowest weighting factors may be removed. The threshold is set at a value based on training time requirements and memory requirements associated with training a machine-learning intent classification model, such as the machine-learning intent classification model 132 of FIG. 1. In an alternate implementation, the feature reducer 304 is configured to reduce the number of features in the weighted feature vectors 310 by removing features for which a combination (e.g., via multiplication) of a respective weighting value and a count of occurrences of the feature in the training set fails to satisfy a threshold.

The input vector generator 306 is configured to receive the reduced feature vectors 312 and to concatenate the reduced feature vectors 312 to generate an input vector 314. The input vector 314 is provided to a machine-learning intent classifier generator, such as the machine-learning intent classification model generator 110 of FIG. 1, to be used to train a machine-learning intent classification model, as described with reference to FIG. 1. Thus, the system 300 (via operations performed by the feature reducer 304) may selectively reduce the number of features used to train a machine-learning intent classification model.

Figure 4:
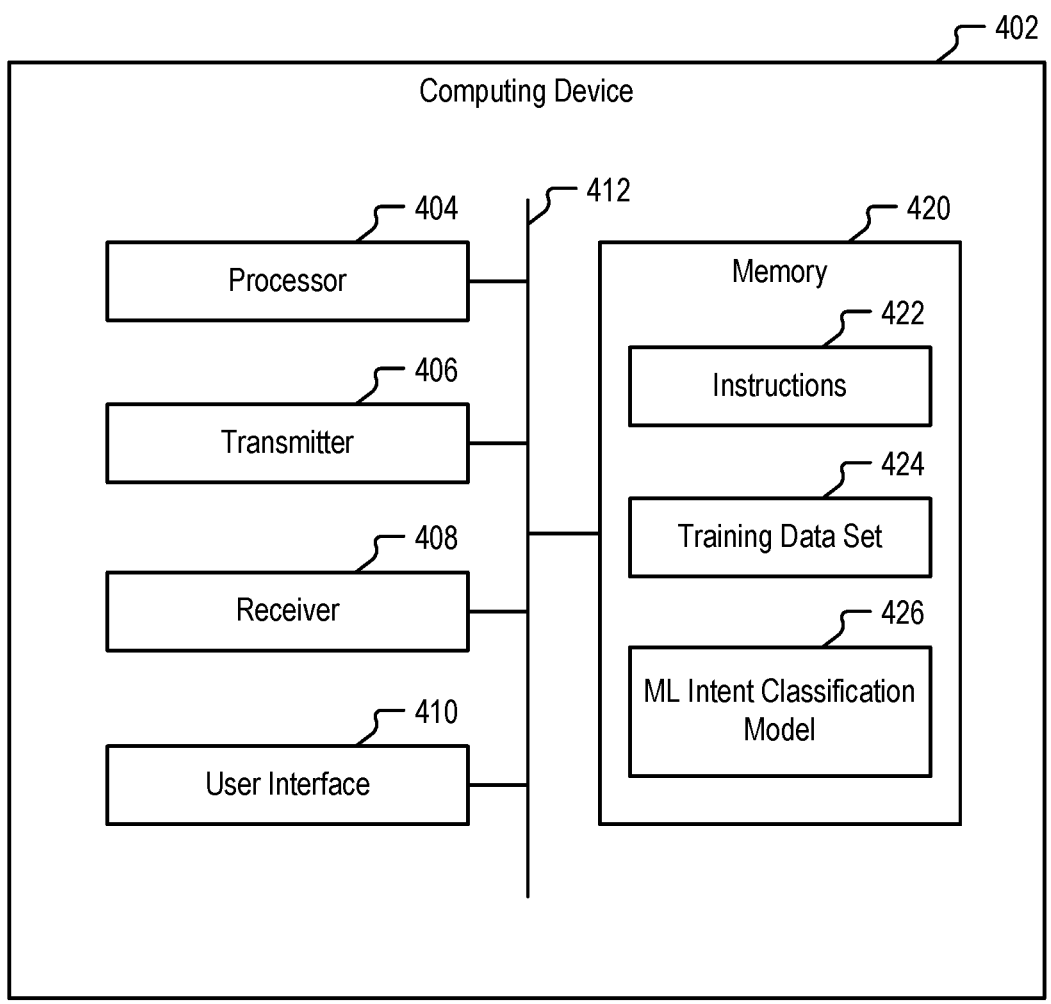
FIG. 4 is a block diagram of a computing device configured to train a machine-learning intent classification model.

FIG. 4 illustrates a diagram of a computing device 402 configured to apply weighting factors to features used to train a machine-learning intent classification model. The computing device 402 may include or correspond to a desktop computer, a laptop computer, a tablet computer, a server, a mainframe, or any other type of computing device.

The computing device includes a processor 404, a transmitter 406, a receiver 408, a user interface 410, and a memory 420. The processor 404, the transmitter 406, the receiver 408, the user interface 410, and the memory 420 may be coupled together via a bus 412 (or other connection). The example illustrated in FIG. 4 is not intended to be limiting, and in other implementations, one or more of the processor 404, the transmitter 406, the receiver 408, the user interface 410, the bus 412, and the memory 420 are optional, or more components may be included in the computing device 402.

The transmitter 406 is configured to enable the computing device 402 to send data to one or more other devices via direct connection or via one or more networks, and the receiver 408 is configured to enable the computing device 402 to receive data from one or more other devices via direct connection or via one or more networks. The one or more networks may include Institute of Electrical and Electronics Engineers (IEEE) 802 wireless networks, Bluetooth networks, telephone networks, optical or radio frequency networks, or other wired or wireless networks. In some implementations, the transmitter 406 and the receiver 408 may be replaced with a transceiver that enables sending and receipt of data from one or more other devices.

The user interface 410 is configured to facilitate user interaction. For example, the user interface 410 is adapted to receive input from a user, to provide output to a user, or a combination thereof. In some implementations, the user interface 410 conforms to one or more standard interface protocols, including serial interfaces (e.g., universal serial bus (USB) interfaces or IEEE interface standards), parallel interfaces, display adapters, audio adaptors, or custom interfaces. In some implementations, the user interface 410 is configured to communicate with one or more input/output devices, such as some combination of buttons, keyboards, pointing devices, displays, speakers, microphones, touch screens, and other devices.

The memory 420 includes volatile memory devices (e.g., random access memory (RAM) devices), nonvolatile memory devices (e.g., read-only memory (ROM) devices, programmable read-only memory, and flash memory), or both. The memory 420 is configured to store instructions 422. The processor 404 is configured to execute the instructions 422 to perform the operations described herein. To illustrate, the processor 404 may execute the instructions 422 to obtain a training data set 424 and use the training data set to generate and train a machine-learning intent classification model 426, in a similar manner to as described with reference to FIG. 1. For example, in a particular implementation, the instructions 422 include training data analysis instructions, feature vector generation instructions, weighting factor application instructions, input vector generation instructions, and machine-learning intent classification generation instructions. The machine-learning intent classification model 426 may be stored at the memory 420 for execution by the computing device 402. Additionally, or alternatively, the transmitter 406 may be configured to transmit the machine-learning intent classification model 426 to a different device for execution at the different device.

Figure 5:
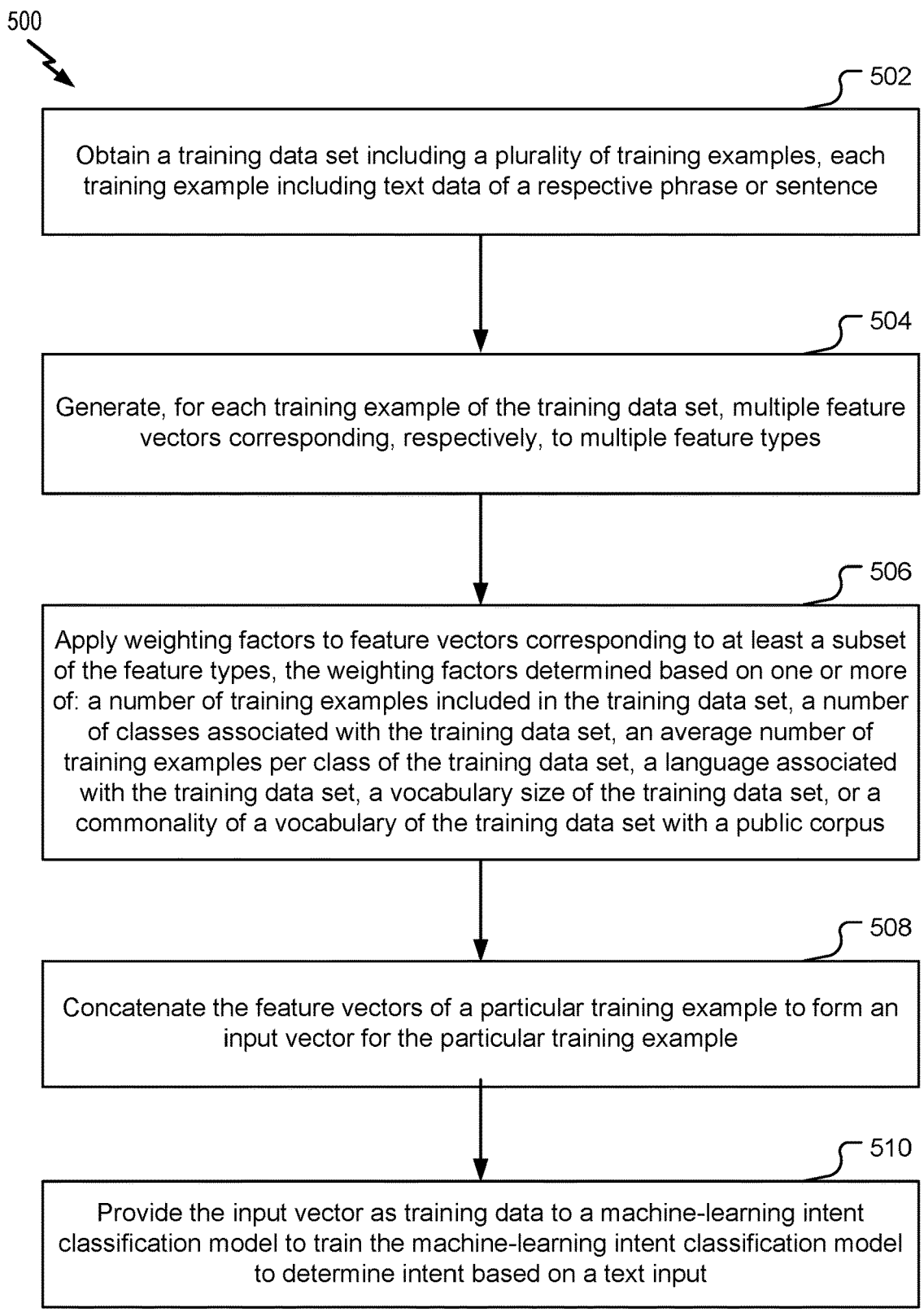
FIG. 5 is a flowchart of a method for applying weighting factors to feature vectors used to train a machine-learning intent classification model.

FIG. 5 is a flowchart of a method 500 for applying weighting factors to features used to train a machine-learning intent classification model. In an illustrative example, the method 500 is performed by the system 100 of FIG. 1 or the computing device 402 of FIG. 4.

The method 500 includes obtaining a training data set including a plurality of training examples, at 502. Each training example includes text data of a respective phrase or sentence. For example, the training data set 120 may be obtained, by accessing a memory or by receiving the training data set 120 from another device. The training data set 120 includes the training examples 122, each of which includes text data of a respective phrase or sentence.

The method 500 includes generating, for each training example of the training data set, multiple feature vectors corresponding, respectively, to multiple feature types, at 504. For example, the feature vector generator 104 generates the multiple feature vectors 126 by extracting different feature types of features from the training data set 120. In a particular implementation, the feature types include character-level features, word-level features, concept features, semantic features, or a combination thereof. In some implementations, each feature vector of the multiple feature vectors includes features of a single feature type. For example, one feature vector includes character-level features while another feature vector includes word-level features.

The method 500 includes applying weighting factors to feature vectors corresponding to at least a subset of the feature types, at 506. The weighting factors are determined based on one or more of a number of training examples included in the training data set, a number of classes associated with the training data set, an average number of training examples per class of the training data set, a language associated with the training data set, a vocabulary size of the training data set, or a commonality of a vocabulary of the training data set with a public corpus. For example, the weighting factor applicator 106 applies weighting factors to the multiple feature vectors 126 based on the characteristics 124 (corresponding to the above-described characteristics) to generate the weighted feature vectors 128. The weighting factors indicate an importance of the at least the subset of the feature types, as described with reference to FIG. 1.

The method 500 includes concatenating the feature vectors of a particular training example to form an input vector for the particular training example, at 508. For example, the input vector generator 108 concatenates feature vectors of the weighted feature vectors 128 corresponding to one of the training examples 122 to generate the input vector 130.

The method 500 further includes providing the input vector as training data to a machine-learning intent classification model to train the machine-learning intent classification model to determine intent based on a text input, at 510. For example, the machine-learning intent classification model generator 110 uses the input vector 130 as training data to train the machine-learning intent classification model 132 to determine intent based on a text input. In a particular implementation, the machine-learning intent classification model includes a neural network or a support vector machine.

In a particular implementation, the subset of the feature types includes character-level features or concept features, and the weighting factors are less than weighting factors applied to other feature vectors of the multiple feature vectors conditioned upon the number of training examples satisfying a first threshold. For example, weighting factors having values that are less than the default weighting factors are applied to the character-level features and the concept features if the number of training examples satisfies a first threshold, as illustrated in the first example 200 of FIG. 2A.

In a particular implementation, the subset of the feature types includes semantic features, and the weighting factors are less than weighting factors applied to other feature vectors of the multiple feature vectors conditioned upon the number of training examples failing to satisfy a second threshold. For example, a weighting factor having a value that is less than the default weighting factors is applied to the semantic features if the number of training examples fails to satisfy a second threshold, as illustrated in the second example 220 of FIG. 2A. In some implementations, the weighting factors are based on the average number of training examples per class of the training data set, as described with reference to FIG. 2A.

In a particular implementation, the subset of the feature types includes character-level features, and the weighting factors are greater than weighting factors applied to other feature vectors of the multiple feature vectors conditioned upon the language matching one of a particular set of languages. For example, a weighting factor having a value that is greater than the default weighting factors is applied to the character-level features if the language matches one of a particular set of languages, as illustrated in the third example 240 of FIG. 2B. In some implementations, the particular set of languages includes Chinese, Korean, Japanese, or any other non-whitespace tokenized language.

In a particular implementation, the subset of the feature types includes word-level features, and the weighting factors are greater than weighting factors applied to other feature vectors of the multiple feature vectors conditioned upon the number of classes associated with the training data set satisfying a threshold. For example, a weighting factor having a value that is greater than the default weighting factors is applied to the word-level features if the number of classes associated with the training data set satisfies a threshold, as illustrated in the fourth example 260 of FIG. 2B.

In a particular implementation, the subset of the feature types includes word-level features, and the weighting factors are greater than weighting factors applied to other feature vectors of the multiple feature vectors conditioned upon the vocabulary size of the training data set satisfying a threshold. For example, a weighting factor having a value that is greater than the default weighting factors is applied to the word-level features if the vocabulary size of the training data set satisfies a threshold, as illustrated in the fifth example 280 of FIG. 2C.

In a particular implementation, the method 500 further includes comparing a number of features included in the multiple feature vectors to a feature threshold and removing one or more features from the multiple feature vectors conditioned upon the number of features satisfying the feature threshold. For example, the feature reducer 304 of FIG. 3 compares the number of features included in the weighted feature vectors 310 to a threshold and removes one or more features to generate the reduced feature vectors 312 if the number satisfies the threshold. In a particular implementation, the one or more features are each associated with a corresponding weighting factor that fails to satisfy a weight threshold.

One benefit provided by method 500 is generation of (e.g., training of) a machine-learning intent classification model faster, using fewer processing resources, than conventional techniques for training machine-learning intent classification models. To illustrate, for training data sets having particular characteristics, some types of features (such as character-level features or word-level features) are more important to the determination of intent than other features. By applying lower weighting factors to the less important features, the method 500 indicates to the machine-learning intent classification model that these particular features are less important and therefore that other features should be focused on during the training process. Because features that are more likely to be relevant to intent are weighted higher than the other features, the machine-learning intent classification model converges faster on an acceptable model. Increasing the speed with which the training converges improves the operation of a computer by decreasing the amount of time and processing resources spent generating the machine-learning intent classification model.

Figure 6:
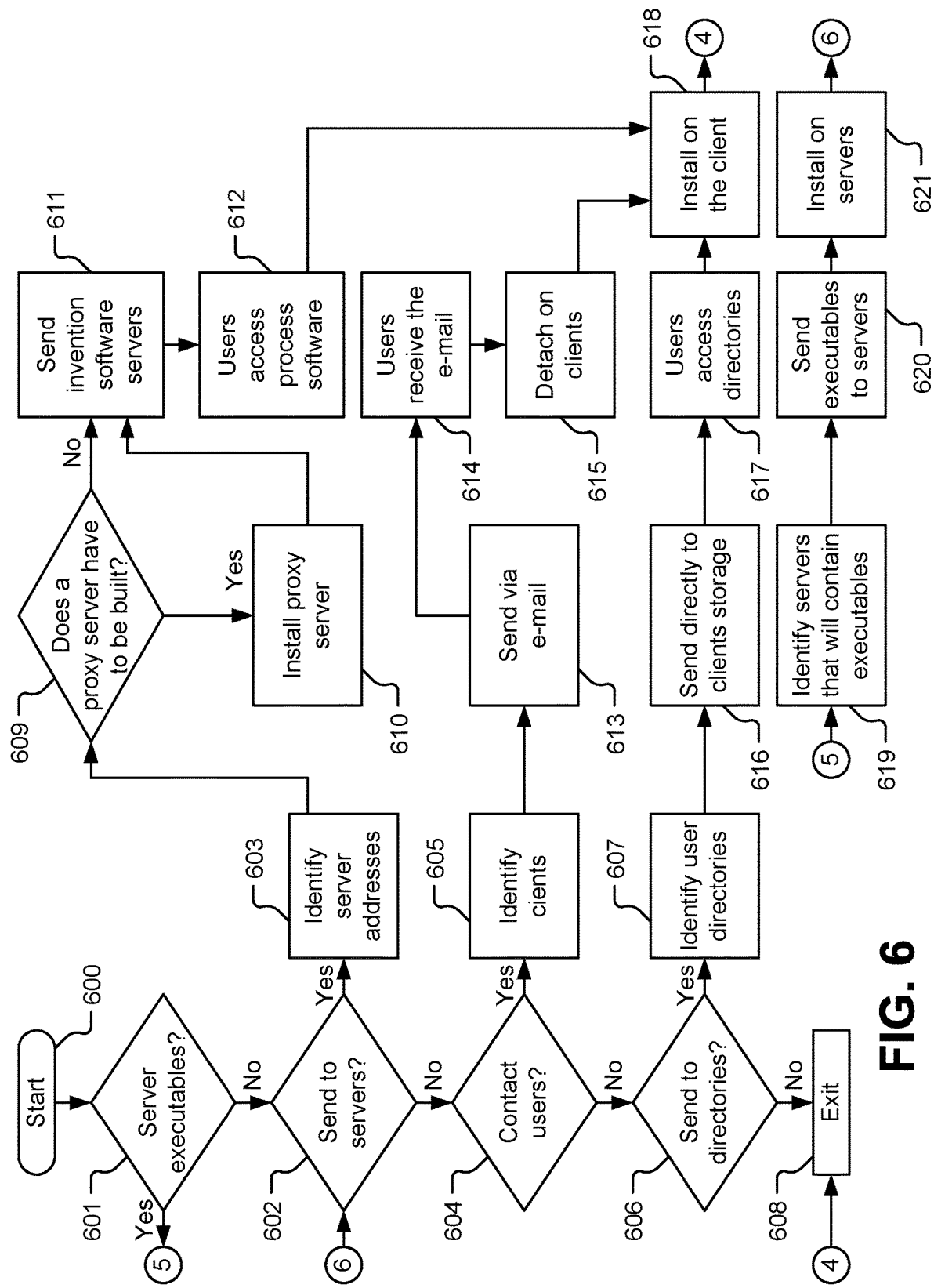
FIG. 6 is a flowchart that illustrates an example of a method of deploying a machine-learning intent classification model.

FIG. 6 is a flowchart that illustrates an example of a method of deploying a machine-learning intent classification system according to an implementation of the present invention. While it is understood that process software, such as the Watson™ (Watson is a registered trademark of International Business Machines Corporation of Armonk, N.Y.) machine-learning intent classification software (such as the machine-learning intent classification model 132 of FIG. 1 or the machine-learning intent classification model 426 of FIG. 4), may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 600 begins the deployment of the process software. An initial step is to determine if there are any programs that will reside on a server or servers when the process software is executed (601). If this is the case, then the servers that will contain the executables are identified (619). The process software for the server or servers is transferred directly to the servers' storage via FTP or some other protocol or by copying though the use of a shared file system (620). The process software is then installed on the servers (621).

Next, a determination is made on whether the process software is to be deployed by having users access the process software on a server or servers (602). If the users are to access the process software on servers, then the server addresses that will store the process software are identified (603).

A determination is made if a proxy server is to be built (609) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (610). The process software is sent to the (one or more) servers either via a protocol such as FTP, or it is copied directly from the source files to the server files via file sharing (611). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (612). Another embodiment is to have the servers automatically copy the process software to each client and then run the installation program for the process software at each client computer. The user executes the program that installs the process software on his client computer (618) and then exits the process (608).

In step 604 a determination is made whether the process software is to be deployed by sending the process software to users via e-mail. The set of users where the process software will be deployed are identified together with the addresses of the user client computers (605). The process software is sent via e-mail to each of the users' client computers (613). The users then receive the e-mail (614) and then detach the process software from the e-mail to a directory on their client computers (615). The user executes the program that installs the process software on his client computer (618) and then exits the process (608).

Lastly, a determination is made on whether the process software will be sent directly to user directories on their client computers (606). If so, the user directories are identified (607). The process software is transferred directly to the user's client computer directory (616). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (617). The user executes the program that installs the process software on his client computer (618) and then exits the process (608).

Figure 7:
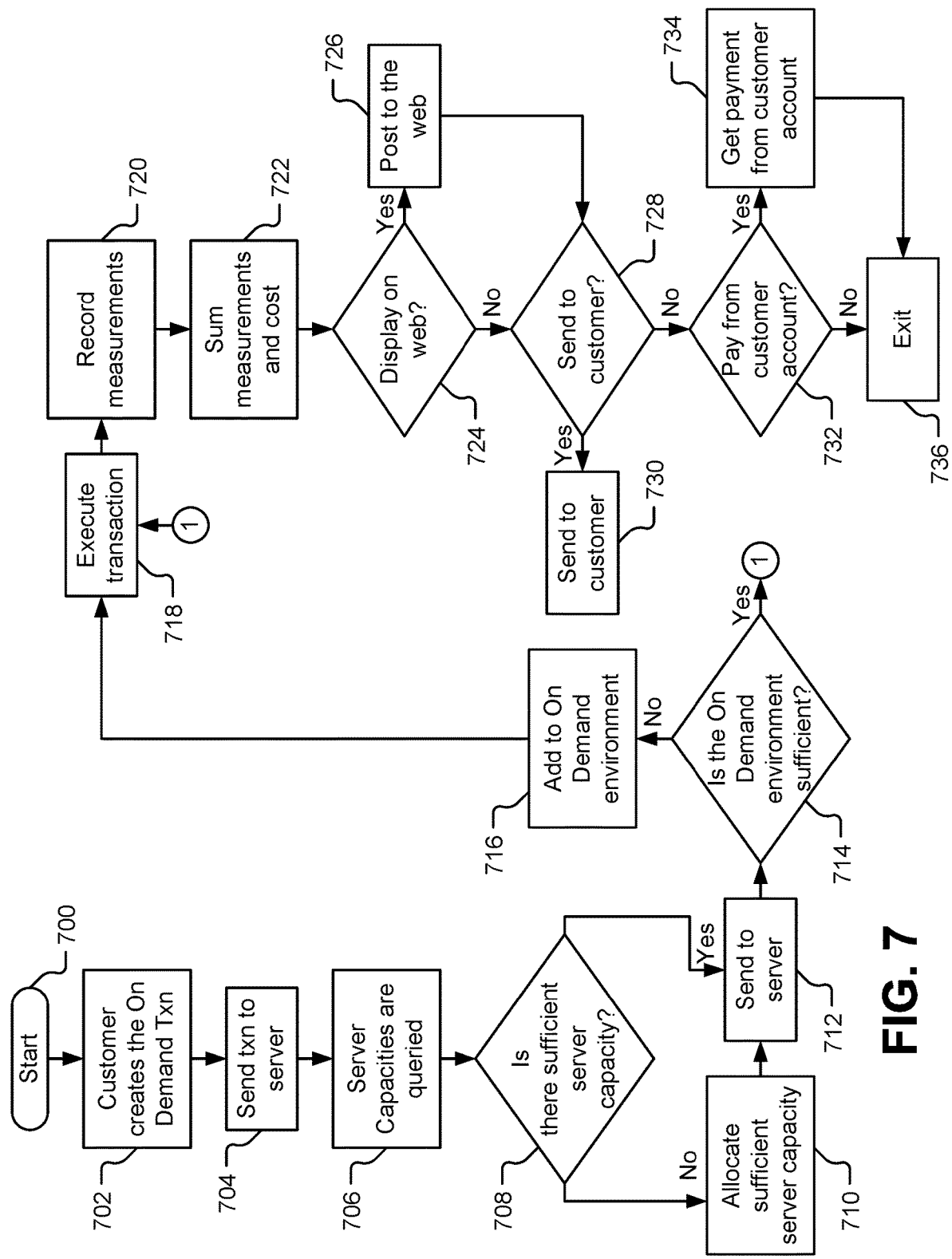
FIG. 7 is a flowchart that illustrates an example of using a machine-learning intent classification model in an on demand context according to an implementation of the present invention.

FIG. 7 is a flowchart that illustrates an example of a method of using a machine-learning intent classification system in an on demand context. In FIG. 7, the process software, such as the Watson machine-learning intent classification software (e.g., the machine-learning intent classification model 132 of FIG. 1 or the machine-learning intent classification model 426 of FIG. 4), may also be shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 700 begins the On Demand process. A transaction is created that contains the unique customer identification, the requested service type, and any service parameters that further specify the type of service (702). The transaction is then sent to the main server (704). In an On Demand environment, the main server can initially be the only server, and then as capacity is consumed other servers are added to the On Demand environment.

The server central processing unit (CPU) capacities in the On Demand environment are queried (706). The CPU requirement of the transaction is estimated, and then the server's available CPU capacity in the On Demand environment is compared to the transaction CPU requirement to see if there is sufficient CPU available capacity in any server to process the transaction (708). If there is not sufficient server CPU available capacity, then additional server CPU capacity is allocated to process the transaction (710). If there was already sufficient available CPU capacity, then the transaction is sent to a selected server (712).

Before executing the transaction, a check is made of the remaining On Demand environment to determine if the environment has sufficient available capacity for processing the transaction. This environment capacity consists of such things as, but not limited to, network bandwidth, processor memory, storage etc. (714). If there is not sufficient available capacity, then capacity will be added to the On Demand environment (716). Next the required software to process the transaction is accessed, loaded into memory, and then the transaction is executed (718).

The usage measurements are recorded (720). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (722).

If the customer has requested that the On Demand costs be posted to a web site (724), then they are posted thereto (726). If the customer has requested that the On Demand costs be sent via e-mail to a customer address (728), then they are sent (730). If the customer has requested that the On Demand costs be paid directly from a customer account (732), then payment is received directly from the customer account (734). On Demand process proceeds to 736 and exits.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
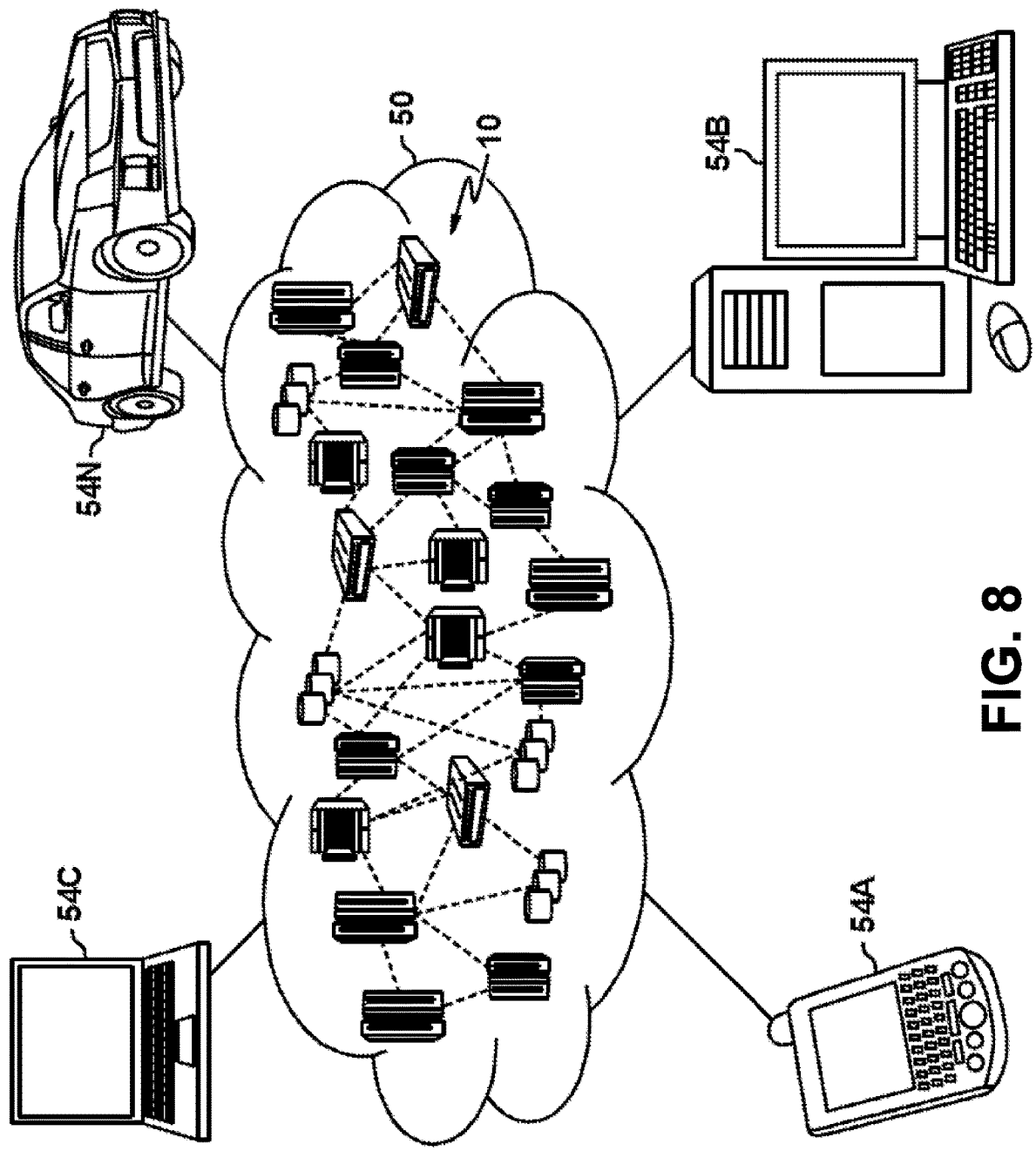
FIG. 8 depicts a cloud computing environment according to an implementation of the present invention.

Referring to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
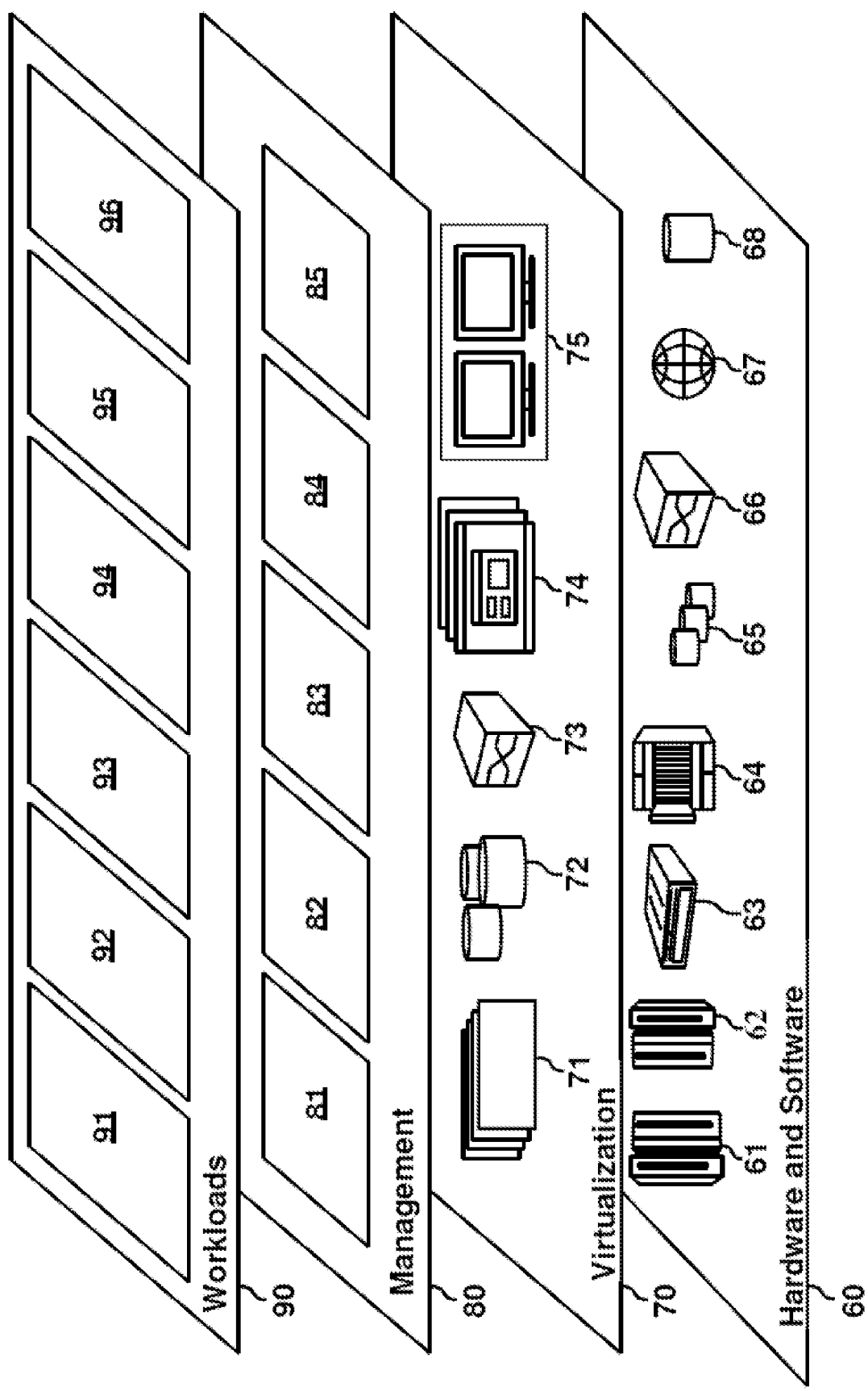
FIG. 9 depicts abstraction model layers according to an implementation of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text recognition and intent determination 96. For example, the text recognition and intent determination 96 may use or have access to a machine-learning intent classification model, such as the machine-learning intent classification model 132 of FIG. 1 or the machine-learning intent classification model 426 of FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of training a machine-learning intent classification model, the computer-implemented method comprising:
    obtaining a training data set including a plurality of training examples, each training example including text data of a respective phrase or sentence;
    generating, for each training example of the training data set, multiple feature vectors corresponding, respectively, to multiple feature types;
    applying weighting factors to feature vectors corresponding to at least a subset of the feature types, the weighting factors determined based on one or more of:
        a number of training examples included in the training data set;
        a number of classes associated with the training data set;
        an average number of training examples per class of the training data set;
        a language associated with the training data set;
        a vocabulary size of the training data set; or
        a commonality of a vocabulary of the training data set with a public corpus;
    concatenating the feature vectors of a particular training example to form an input vector for the particular training example, wherein the subset of the feature types comprises semantic features, and wherein the weighting factors for the semantic features are less than weighting factors applied to other feature vectors of the multiple feature vectors; and
    providing the input vector as training data to the machine-learning intent classification model to train the machine-learning intent classification model to determine intent based on a text input.

2. The computer-implemented method of claim 1, wherein the feature types include character-level features, word-level features, concept features, semantic features, or a combination thereof.

3. The computer-implemented method of claim 1, wherein each feature vector of the multiple feature vectors includes features of a single feature type.

4. The computer-implemented method of claim 1, wherein the subset of the feature types comprises character-level features or concept features, and wherein the weighting factors are less than weighting factors applied to other feature vectors of the multiple feature vectors conditioned upon the number of training examples satisfying a first threshold.

5. The computer-implemented method of claim 1, wherein the weighting factors are applied to the semantic features conditioned upon the number of training examples failing to satisfy a second threshold.

6. The computer-implemented method of claim 5, wherein the weighting factors are based on the average number of training examples per class of the training data set.

7. The computer-implemented method of claim 1, wherein the subset of the feature types comprises character-level features, and wherein the weighting factors are greater than weighting factors applied to other feature vectors of the multiple feature vectors conditioned upon the language matching one of a particular set of languages.

8. The computer-implemented method of claim 7, wherein the particular set of languages includes Chinese, Korean, Japanese, or any other non-whitespace tokenized language.

9. The computer-implemented method of claim 1, further comprising:
    comparing a number of features included in the multiple feature vectors to a feature threshold; and
    removing one or more features from the multiple feature vectors conditioned upon the number of features satisfying the feature threshold.

10. The computer-implemented method of claim 9, wherein the one or more features are each associated with a corresponding weighting factor that fails to satisfy a weight threshold.

11. The computer-implemented method of claim 1, wherein the weighting factors indicate an importance of the at least the subset of the feature types.

12. The computer-implemented method of claim 1, wherein the machine-learning intent classification model comprises a neural network or a support vector machine.

13. An apparatus comprising:
    a processor; and
    a memory coupled to the processor and storing instructions that, when executed by the processor, cause the processor to perform operations comprising:
        obtaining a training data set including a plurality of training examples, each training example including text data of a respective phrase or sentence;
        generating, for each training example of the training data set, multiple feature vectors corresponding, respectively, to multiple feature types;
        applying weighting factors to feature vectors corresponding to at least a subset of the feature types, the weighting factors determined based on one or more of:
            a number of training examples included in the training data set;

a number of classes associated with the training data set;

an average number of training examples per class of the training data set;

a language associated with the training data set;

a vocabulary size of the training data set; or a commonality of a vocabulary of the training data set with a public corpus;

concatenating the feature vectors of a particular training example to form an input vector for the particular training example, wherein the subset of the feature types comprises semantic features, and wherein the weighting factors for the semantic features are less than weighting factors applied to other feature vectors of the multiple feature vectors; and providing the input vector as training data to a machine-learning intent classification model to train the machine-learning intent classification model to determine intent based on a text input.

14. The apparatus of claim 13, wherein the feature types include character-level features, word-level features, concept features, semantic features, or a combination thereof.

15. The apparatus of claim 13, further comprising a transmitter configured to transmit the machine-learning intent classification model to a device for execution at the device.

16. The apparatus of claim 13, wherein the machine-learning intent classification model comprises a neural network or a support vector machine.

17. A computer program product for training a machine-learning intent classification model, the computer program product comprising a computer readable storage medium having program instructions embodied therewith, the program instructions executable by a processor to cause the processor to:

obtain, by the processor, a training data set including a plurality of training examples, each training example including text data of a respective phrase or sentence;

generate, by the processor for each training example of the training data set, multiple feature vectors corresponding, respectively, to multiple feature types;

apply, by the processor, weighting factors to feature vectors corresponding to at least a subset of the feature types, the weighting factors determined based on one or more of:

a number of training examples included in the training data set;

a number of classes associated with the training data set;

an average number of training examples per class of the training data set;

a language associated with the training data set;

a vocabulary size of the training data set; or a commonality of a vocabulary of the training data set with a public corpus;

concatenate, by the processor, the feature vectors of a particular training example to form an input vector for the particular training example, wherein the subset of the feature types comprises semantic features, and wherein the weighting factors for the semantic features are less than weighting factors applied to other feature vectors of the multiple feature vectors; and provide, by the processor, the input vector as training data to the machine-learning intent classification model to train the machine-learning intent classification model to determine intent based on a text input.

18. The computer program product of claim 17, wherein the subset of the feature types comprises character-level features or concept features, and wherein the weighting factors are less than weighting factors applied to other feature vectors of the multiple feature vectors conditioned upon the number of training examples satisfying a first threshold.

19. The computer program product of claim 17, wherein the subset of the feature types comprises word-level features, and wherein the weighting factors are greater than weighting factors applied to other feature vectors of the multiple feature vectors conditioned upon the number of classes associated with the training data set satisfying a threshold.

20. The computer program product of claim 17, wherein the subset of the feature types comprises word-level features, and wherein the weighting factors are greater than weighting factors applied to other feature vectors of the multiple feature vectors conditioned upon the vocabulary size of the training data set satisfying a threshold.

* * * * *